United States Patent [19]

Christen

[11] Patent Number: 4,502,631

[45] Date of Patent: Mar. 5, 1985

[54] TRICKLE IRRIGATION UNIT

[75] Inventor: Hans D. Christen, La Verne, Calif.

[73] Assignee: Rain Bird Sprinkler Mfg. Corp., Glendora, Calif.

[21] Appl. No.: 478,369

[22] Filed: Mar. 24, 1983

[51] Int. Cl.³ .................. F16K 7/12; A01G 25/00
[52] U.S. Cl. .......................... 239/106; 239/542
[58] Field of Search .................. 239/106–109, 239/542

[56] References Cited

U.S. PATENT DOCUMENTS

| B 570,382 | 4/1976 | Spencer | 239/542 X |
|---|---|---|---|
| 3,693,888 | 9/1972 | Rondas | 239/542 X |
| 3,779,468 | 12/1973 | Spencer | 239/542 |
| 3,797,754 | 3/1974 | Spencer | 239/542 |
| 3,807,430 | 4/1974 | Keller . | |
| 3,954,223 | 5/1976 | Wichman et al. | 239/542 X |
| 3,993,248 | 11/1976 | Harmony | 239/542 X |
| 4,009,832 | 3/1977 | Tiedt | 239/542 |
| 4,077,570 | 3/1978 | Harmony | 239/542 X |
| 4,077,571 | 3/1978 | Harmony | 239/542 X |
| 4,161,291 | 7/1979 | Bentley | 239/542 |
| 4,344,576 | 8/1982 | Smith | 239/542 |
| 4,424,936 | 1/1984 | Marc | 239/542 X |

FOREIGN PATENT DOCUMENTS 2018113 10/1979 United Kingdom ............... 239/542

Primary Examiner—Andres Kashnikow
Attorney, Agent, or Firm—Fulwider, Patton, Rieber, Lee & Utecht

[57] ABSTRACT

An improved trickle irrigation unit is provided having a resilient valve flap within a pressure chamber to control flow of irrigation water through an outlet port. The valve flap overlies the outlet port and a shallow channel including a small central outlet groove wherein the flap, channel, and groove cooperatively define a water flow path from the pressure chamber to the outlet port. The valve flap deforms into this flow path in response to water pressure within the pressure chamber to vary the flow path cross-sectional area to correspondingly control water flow to the outlet port. In accordance with the invention, the outlet port has a relatively narrow and elongated configuration extending preferably in longitudinal alignment with the outlet groove, wherein this narrow geometry prevents excessive valve flap deformation into the outlet port which could otherwise block the downstream end of the outlet groove to interfere with proper operation of the irrigation unit.

10 Claims, 5 Drawing Figures

U.S. Patent    Mar. 5, 1985    4,502,631
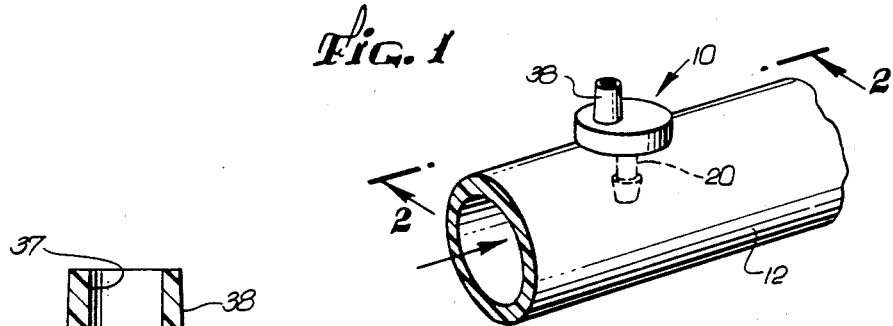
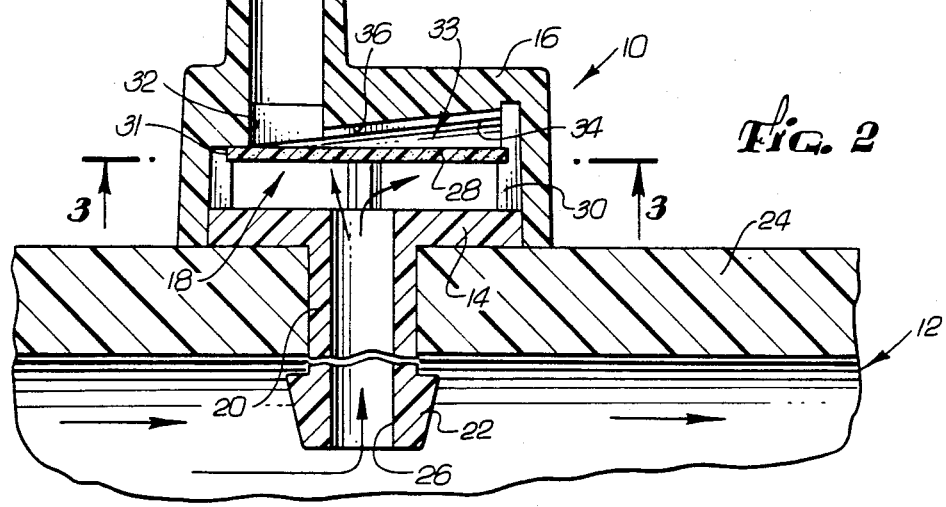
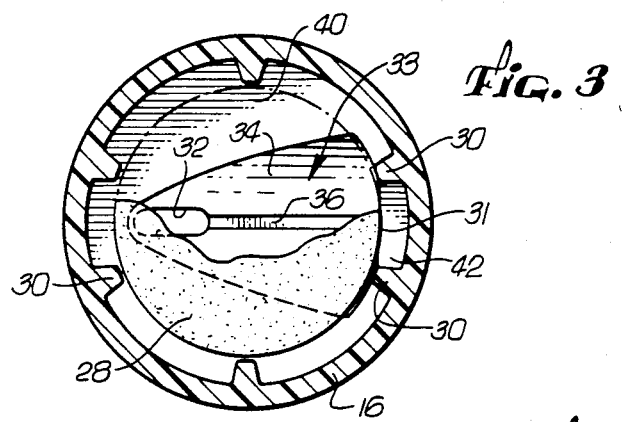
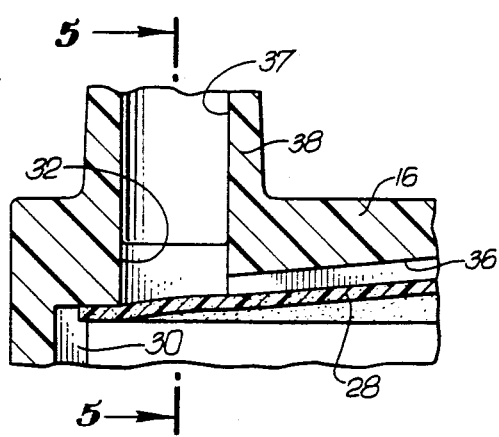
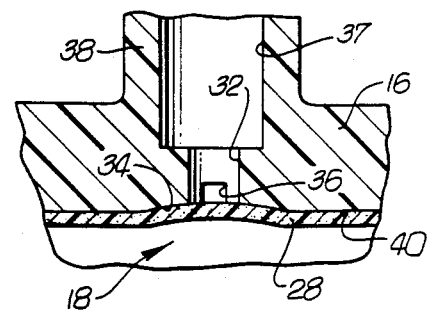

TRICKLE IRRIGATION UNIT

BACKGROUND OF THE INVENTION

This invention relates generally to trickle irrigation units for providing a relatively slow, substantially drip flow rate of water for irrigating crops and the like. More specifically, this invention relates to an improved trickle irrigation unit, particularly of the type described in U.S. Pat. No. 3,954,223.

A variety of so-called trickle irrigation units are known for use in supplying water at a relatively slow, substantially drip flow rate to irrigate crops or the like without significant evaporation and/or erosion of soil. Such trickle irrigation units are typically installed along the length of an elongated water supply conduit at predetermined points at which irrigation water is desired, such as directly at the bases of individual plants, whereupon water under relatively high pressure is supplied to the conduit for flow into and through the irrigation units. The irrigation units are designed each to permit passage of a relatively small portion of the water within the supply conduit while substantially reducing the pressure thereof such that the water is emitted from the unit without spraying at a flow rate such as on the order of about one-half gallon per hour.

In some trickle irrigation units, such as that shown and described in U.S. Pat. No. 3,954,223, the unit includes an internal pressure chamber for receiving water under pressure from a water supply conduit and a resilient valve flap for controlling the flow of water from the pressure chamber to an outlet port. More particularly, the valve flap overlies a circular outlet port and a shallow channel including a smaller central outlet groove at one side of the pressure chamber, wherein the valve flap cooperates with the channel and groove to define a flow path communicating between the pressure chamber and the outlet port. When water pressure within the pressure chamber is relatively low, such as when a water supply is initially turned on, the valve flap remains substantially undeformed to permit a relatively high flushing flow through the shallow channel and the outlet groove to the outlet port to wash grit and the like from the unit. However, when the water pressure is relatively high, the valve flap deforms into the channel to reduce the cross-sectional area of the flow path to the comparatively smaller area of the outlet groove. This reduced flow path area functions as an orifice to limit water flow to the outlet port to a relatively low-pressure, substantially drip rate which can be maintained substantially constant throughout a range of relatively high water pressures by designing the valve flap for sufficient flexibility for pressure compensating movement partially into the outlet groove to alter the flow area thereof generally in inverse relation to water pressure.

In trickle irrigation units of this general type, the resilient valve flap thus deforms into the outlet port, the shallow channel, and the outlet groove with a magnitude of deformation directly proportional to the pressure within the pressure chamber. Since the outlet port is significantly larger in cross-sectional area than the outlet groove to permit grit passage during low pressure flushing, flap deformation into the outlet port at higher water pressures is therefore substantially greater than the deformation of the flap into the outlet groove. As a result, at relatively high water pressures, deformation of the valve flap into the outlet port can be sufficient to block or severely restrict the downstream end of the outlet groove which opens into the outlet port thereby interferring with the desired operation of the irrigation unit.

The present invention overcomes these problems and disadvantages by providing an improved trickle irrigation unit generally of the type described, wherein the outlet port is specially contoured to permit grit passage during low pressure flushing while preventing excessive deformation of the valve flap into the outlet port at higher water pressures thereby preventing undesirable blockage of the downstream end of the outlet groove.

SUMMARY OF THE INVENTION

In accordance with the present invention, an improved trickle irrigation unit is provided for supplying a relatively low-pressure and substantially drip flow of irrigation water to crops and the like. The unit is adapted for convenient connection to a water supply conduit and includes a pressure-responsive resilient valve flap disposed within an internal pressure chamber for controlling the flow rate and pressure of water emitted through an outlet port. According to the invention, this outlet port is specifically contoured to permit passage of grit and the like during flushing of the unit when water pressure within the pressure chamber is relatively low, while preventing excess deformation of the valve flap into the outlet port when the pressure is relatively high wherein such deformation could otherwise block the desired flow of water to the outlet port.

In one particular form of the trickle irrigation unit, the valve flap overlies the outlet port and a shallow channel including a small central outlet groove at one side of the pressure chamber, wherein the flap cooperates with the channel and groove to define a flow path for water from the pressure chamber to the outlet port. When water pressure within the pressure chamber is relatively low, such as when a water supply is initially turned on, the valve flap remains substantially undeformed and permits a relatively high flow through the shallow channel and the outlet groove and further through the outlet port sufficient to flush grit and the like from the unit. However, when water pressure increases to a relatively high level, the water pressure deforms the valve flap into sealing engagement against the shallow channel to confine flow communication between the pressure chamber and the outlet port to the comparatively smaller area of the outlet groove. This restricts the output of the irrigation unit to a relatively low-pressure, substantially drip flow which is maintained relatively constant over a range of relatively high water supply pressures by pressure-compensating deformation of the valve flap partially into the outlet groove to vary the cross-sectional flow area thereof.

In accordance with a preferred form of the invention, the outlet port has a relatively narrow elongated shape oriented generally in longitudinal alignment with the outlet groove. With this configuration, the outlet port can be sized with a cross-sectional area substantially greater than the cross-sectional flow area of the outlet groove as required for passage of grit and the like during low-pressure flushing. However, the transverse width of the outlet port is relatively narrow such that deformation of the valve flap into the outlet port is minimized when the water pressure is relatively high thereby preventing such deformation from obstructing the downstream end of the outlet groove opening into the outlet port.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective view of a trickle irrigation unit embodying the novel features of the invention and illustrated installed on a water supply conduit;

FIG. 2 is an enlarged fragmented vertical section taken generally on the line 2—2 of FIG. 1;

FIG. 3 is a horizontal section taken generally on the line 3—3 of FIG. 2;

FIG. 4 is an enlarged fragmented vertical section illustrating a portion of the trickle irrigation unit during operation thereof; and FIG. 5 is an enlarged fragmented vertical section taken generally on the line 5—5 of FIG. 4.

DETAILED DESCRIPTION OF THE PREFERRED EMBODIMENT

As shown in the exemplary drawings, the present invention is embodied in an improved trickle irrigation unit referred to generally by the reference numeral 10 for use in irrigating crops or the like. The trickle irrigation unit 10 is adapted for convenient mounting at predetermined points along the length of a water supply conduit 12, with one of said units being illustrated by way of example in FIG. 1, wherein the water supply conduit 12 is in turn selectively connected to an appropriate source of water under pressure (not shown). In operation, the trickle irrigation unit 10 responds to the pressure of water within the supply conduit 12 to provide a relatively high flow output when the pressure is low to flush grit and the like from the unit and to reduce the flow output to a relatively slow, substantially drip flow rate which is maintained substantially constant throughout a range of relatively higher water pressures.

The trickle irrigation unit 10 of the present invention provides an improvement upon trickle irrigation units particularly of the general type shown and described in U.S. Pat. No. 3,954,223, wherein such units include a valve member typically in the form of a resilient flap positioned within an internal pressure chamber to overlie a relatively large outlet port and one or more channels and small grooves cooperating with the flap to define a water flow path between the pressure chamber and the outlet port. The valve flap deforms into the channels and grooves in response to the water pressure within the pressure chamber to vary the cross-sectional area of the flow path and thereby control the flow rate of water to the outlet port. However, in accordance with the presently improved trickle irrigation unit, the outlet port is specially configured to prevent excessive flap deformation thereinto when water pressure is relatively high to correspondingly prevent the flap from blocking or unduly restricting the downstream ends of the small grooves which open into the outlet port, wherein such excessive deformation can otherwise interfere with proper operation of the trickle irrigation unit.

As shown in detail in FIGS. 2 and 3, the trickle irrigation unit 10 comprises in one exemplary form a lower housing half 14 and an upper housing half 16 which can be inexpensively constructed from a molded plastic or the like for connection together, for example, by ultrasonic welding, to define a generally disk-shaped internal pressure chamber 18. The lower housing half 14 includes an integral inlet tube 20 having a barbed end 22 suitable for sealed passage through the wall 24 of the water supply conduit 12 which is typically provided in the form of a plastic pipe, garden hose, or the like. Water within the water supply conduit 12 is communicated to the pressure chamber 18 via an inlet passage 26 in the inlet tube 22. Alternatively, the trickle irrigation unit can be adapted for mounting onto the water supply conduit by other means, such as clamps or the like.

The water under pressure supplied to the pressure chamber 18 flows against the underside, as viewed in FIG. 2, of a circular resilient valve flap 28 formed from a pliable rubber-based material or the like. This valve flap 28 is sized with a diameter somewhat less than the diameter of the pressure chamber and is loosely retained centrally within the chamber for floating movement toward and away from the inlet passage 26 by a plurality of ribs 30 molded into the upper housing half 16 with circumferential spacing about the periphery of the pressure chamber. The valve flap 28 separates the inlet passage 26 within the inlet tube 22 from an outlet port 32 formed in the upper mold half 16 at a position offset from the axial center of the pressure chamber and a valve flow path geometry recessed into the upper mold half and referred to generally by the reference numeral 33. This flow path geometry 33 extends generally from a point adjacent the periphery of the pressure chamber 18 to the outlet port 32 and cooperates with the valve flap 28 to define a water flow path leading from the pressure chamber 18 to intersect with the outlet port 32.

More particularly, as shown in FIGS. 2 and 3, the flow path geometry 33 comprises a relatively shallow channel 34 of generally parabolic shape having a relatively wide open end positioned near the periphery of the pressure chamber 18. The channel 34 extends from the chamber periphery generally across the chamber with a decreasing depth and a decreasing transverse width to terminate with an apex region circumscribing the outlet port 32. In addition, the flow path geometry includes a relatively small outlet groove 36 of substantially uniform depth and transverse width extending along the axis of the parabolic channel 34 and opening directly into the outlet port 32.

When water under pressure is supplied through the water supply conduit 12 to the pressure chamber 18, the valve flap 28 is urged by the water pressure upwardly within the pressure chamber, as viewed in FIG. 2, against the upper mold half 16 in a position overlying the channel 34, outlet groove 36, and outlet port 32. In this position, the valve flap 28 seals against the relatively flat surface 40 of the upper mold half bounding the recessed channel 34 to confine water flow from the pressure chamber to passage outside the valve flap periphery 31 to a trough 42 recessed into the upper mold half 16 between a pair of the ribs 30 at the open end of the channel 34.

When the water pressure within the pressure chamber 18 is relatively low, such as when the water supply is initially turned on, the valve flap 28 remains substantially undeformed, as depicted in FIG. 2, to permit a relatively high flow rate of water through the channel 34 and the groove 36 to the outlet port 32. This high water flow rate functions to flush grit, particulate, and the like from the trickle irrigation unit for discharge through the outlet port 32, which is sized to permit passage thereof, and further to the exterior of the unit through an outlet passage 37 in a short outlet tube 38 molded as a part of the upper mold half 16.

When the water pressure within the pressure chamber increases to a relatively high level, the valve flap deforms into the shallow channel 34, as shown in FIGS. 4 and 5, to confine water flow to the small cross-sectional area to the outlet groove 36. This reduces the water flow through the outlet port to a slow, substantially drip rate which can be maintained substantially constant throughout a range of relatively high water pressures by designing the valve flap 28 for pressure-compensating deformation partially into the groove 36 to vary the cross-sectional flow area thereof generally in inverse relation to water pressure.

In accordance with the invention, the outlet port 32 is specially configured to provide sufficient cross-sectional flow area for grit passage during low pressure flushing while preventing excessive deformation of the valve flap 28 thereinto when the water pressure within the pressure chamber 28 is relatively high, thereby preventing the pressure-deformed valve flap from blocking the discharge end of the outlet groove 36. More particularly, as shown best in FIG. 3, the outlet port 32 has a relatively elongated and relatively narrow or oblong shape oriented generally in longitudinal alignment with the outlet groove 36. This outlet port shape thus provides a substantial flow area for passage of water, wherein the transverse width of the port is chosen to be slightly larger than the size of anticipated grit and the like which must be flushed from the unit 10. However, the transverse width of the outlet port is sufficiently narrow such that the opposite margins thereof provide closely spaced structural supports preventing excessive pressure-responsive deformation of the valve flap into the outlet port. The valve flap is thus prevented from extending into the outlet port 32 for any distance substantially greater than its deformation into the outlet groove 36, as viewed in FIG. 4, whereby the flap cannot block the downstream end of the outlet groove 36 to interfere with the desired operation of the trickle irrigation unit.

The present invention thus provides a simple yet highly effective trickle irrigation unit of the type including an internal pressure-responsive deformable valve member or flap controlling water output flow. By eliminating excess valve flap deformation into the outlet port, the desired drip output flow rate can be more accurately obtained and maintained throughout a wider range of relatively high water pressures without fear of blocking the small outlet groove 36. Moreover, the resilient valve flap tends to resist setting in a deformed state after a prolonged period of use thereby increasing the useful life of the trickle irrigation unit.

A variety of modifications and improvements to the invention described herein are believed to be apparent to one skilled in the art. Accordingly, no limitation on the invention is intended, except by way of the appended claims.

What is claimed is:

1. A trickle irrigation unit, comprising:
a housing having an internal pressure chamber, an inlet for communicating a supply of water under pressure to said pressure chamber, an outlet port at one side of said pressure chamber remote from said inlet, and a recessed flow path formed in said housing at said one side of said pressure chamber to intersect said outlet port; and
a resilient valve member within said housing to overlie said outlet port and to cooperate with said recessed flow path to define a flow passage from said pressure chamber to said outlet port, said valve member being deformable into said outlet port and recessed flow path in response to the pressure within said pressure chamber to vary the cross-sectional area of the flow passage in a manner permitting a relatively high flow to said outlet port when said pressure is relatively low and a substantially reduced flow when said pressure is relatively high; said outlet port having a generally oblong configuration with a length and width sufficient to pass grit and the like when said pressure is relatively low and a width sufficiently narrow to prevent pressure-responsive deformation of said valve member into said outlet port from significantly obstructing the flow passage when said pressure is relatively high.

2. The trickle irrigation unit of claim 1 wherein said recessed flow path extends generally along a longitudinal axis with an upstream end in flow communication with said pressure chamber and a downstream end intersecting with said outlet port, said outlet port being oriented generally in longitudinal alignment with said recessed flow path axis.

3. The trickle irrigation unit of claim 1 wherein said recessed flow path is formed in said one side of said housing to include at least one relatively shallow channel and at least one relatively small and substantially linear outlet groove, said outlet port being oriented generally in longitudinal alignment with said groove.

4. The trickle irrigation unit of claim 3 wherein said outlet groove extends generally along a longitudinal axis of said shallow channel.

5. In a trickle irrigation unit having a housing defining a pressure chamber for receiving a supply of water under pressure, an outlet port at one side of the pressure chamber, a recessed flow path at said one side of the pressure chamber and intersecting with the outlet port, and a pressure-responsive valve member overlying the outlet port and cooperating with the recessed flow path to define a flow passage from the pressure chamber to the outlet port, said valve member being deformable into the outlet port and the flow path to control water flow to the outlet port generally in inverse relation to the pressure within the pressure chamber, the improvement comprising:
providing the outlet port to have a generally elongated and relatively narrow configuration with a length and width sufficient to pass grit and the like when the pressure is relatively low and a width sufficiently narrow to prevent pressure-responsive deformation of the valve member into the outlet port from significantly obstructing flow of water through the recessed flow path when the pressure is relatively high.

6. The trickle irrigation unit of claim 5 wherein the recessed flow path extends generally along a longitudinal axis with an upstream end in flow communication with said pressure chamber and a downstream end intersecting with the outlet port, the outlet port being oriented generally in longitudinal alignment with the recessed flow path axis.

7. The trickle irrigation unit of claim 5 wherein the recessed flow path is formed in the one side of the housing to include at least one relatively shallow channel and at least one relatively shallow channel and at least one relatively small substantially linear outlet groove, the outlet port being oriented generally in longitudinal alignment with said groove.

8. A trickle irrigation unit, comprising:
a housing having a generally disk-shaped internal pressure chamber, an inlet opening into one circular side of the pressure chamber for communicating a supply of water under pressure thereinto, an outlet port formed in the other circular side of the pressure chamber, and a relatively shallow channel having a comparatively smaller outlet groove therein recessed into said housing at said other circular side of the pressure chamber each with a downstream end intersecting with the outlet port and an upstream end disposed generally at the periphery of the pressure chamber;
a resilient valve flap within the pressure chamber to overlie said outlet port and said shallow channel and outlet groove; and
means for retaining said valve flap generally in spaced relation from the periphery of the pressure chamber in the vicinity of the upstream end of said shallow channel and outlet groove, said valve flap cooperating with said shallow channel and outlet groove to define a flow path having an upstream end exposed to the pressure chamber and a downstream end opening into the outlet port;
said valve flap being deformable into said shallow channel and partially into said outlet groove in response to water pressure within the pressure chamber to vary the cross-sectional area of the path to permit a relatively high flow to said outlet port when said pressure is relatively low and a substantially reduced flow when said pressure is relatively high;
said outlet port having a generally oblong configuration with a length and width sufficient to pass grit and the like when said pressure is relatively low and a width sufficiently narrow to prevent pressure-responsive deformation of said valve member into said outlet port from significantly obstructing the flow path when said pressure is relatively high.

9. The trickle irrigation unit of claim 8 wherein said shallow channel has a generally parabolic shape extending from an open end adjacent the periphery of the pressure chamber with decreasing depth and transverse width toward an apex end intersecting with the outlet port, and wherein said outlet groove has a substantially uniform depth and transverse width extending generally along the axis of said shallow channel from adjacent the periphery of the pressure chamber to intersect with the outlet port, said outlet port being oriented generally in longitudinal alignment with the outlet groove.

10. The trickle irrigation unit of claim 8 wherein said retaining means comprises a plurality of circumferentially spaced ribs formed about the periphery of the pressure chamber for maintaining said valve flap in spaced relation with said periphery.

* * * * *

UNITED STATES PATENT AND TRADEMARK OFFICE
CERTIFICATE OF CORRECTION

PATENT NO. : 4,502,631
DATED : March 5, 1985
INVENTOR(S) : Hans D. Christen

It is certified that error appears in the above-identified patent and that said Letters Patent is hereby corrected as shown below:

Column 5, line 10, delete "to" and insert therefor --of--.

Column 7, line 2, delete "and at least one relatively shallow channel".

Signed and Sealed this

Sixteenth Day of July 1985

[SEAL]

Attest:

DONALD J. QUIGG

Attesting Officer

Acting Commissioner of Patents and Trademarks